Patented Nov. 14, 1944

2,362,548

UNITED STATES PATENT OFFICE 2,362,548

TRISAZO DYESTUFFS

Joseph Gyr and Raymond Gunst, Basel, Switzerland, assignors to Society of Chemical Industry in Basle, Basel, Switzerland, a Swiss company No Drawing. Application June 15, 1942, Serial No. 447,148. In Switzerland July 5, 1941

3 Claims. (Cl. 260—169)

In British Patent No. 20,278/97, trisazo dyestuffs are described which correspond to the general formula

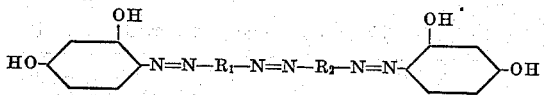

in which $R_1$ represents an arylene nucleus, for example, a phenylene or a diphenylene nucleus, in which the two azo groups are placed in the 1:4- or 4:4'-position to one another, and in which $R_2$ stands for the radical of a hydroxynaphthalene sulfonic acid, in which the azo group united to the radical $R_1$ is connected to the position in the naphthalene nucleus ortho to the OH-group and in which the other azo group is linked to the other portion of the naphthalene nucleus.

From British Patent No. 523,918 it is further to be inferred that, among the above dyestuffs, those in which the radical $R_2$ is derived from 2-amino-5-hydroxynaphthalene-7-sulfonic acid possess particular interest. Their dyeings on textiles possess the valuable property of being capable of development with diazo compounds, such as diazotized paranitraniline, such a procedure increasing their tinctorial properties and enhancing their fastness properties.

It has now been found that new dyestuffs can be prepared which, compared with the analogously constructed dyestuffs of the British patents named, possess the surprising advantage of yielding dyeings which can be developed with diazotized paranitraniline to produce even faster dyed shades. Such dyestuffs are prepared by methods of themselves known and possess the general formula

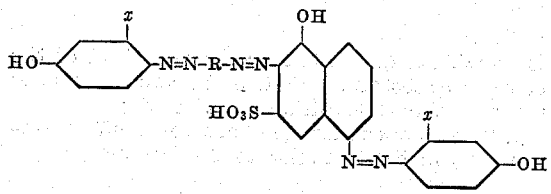

in which R represents an arylene radical of the benzene series, in which the two azo groups stand in the 1:4-position to one another, and in which the two $x$ represent hydroxyl or amino groups.

These dyestuffs are most simply prepared by tetrazotizing azo dyestuffs of the general formula

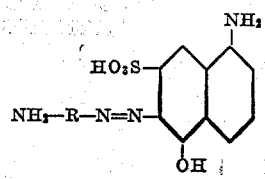

in which R stands for a phenylene radical, in which the $NH_2$ and the $-N=N-$ groups are in the 1:4-position to one another, and coupling them with 2 molecules of resorcinol or 2 molecules of meta-aminophenol or 1 molecule resorcinol and 1 molecule meta-aminophenol.

The following examples illustrate the invention, but are not to be regarded as limiting it in any way, the parts being by weight:

Example 1

15.0 parts of 1-amino-4-acetaminobenzene are diazotized in known manner and are coupled with a solution of 23.9 parts of 1-amino-5-hydroxynaphthalene-7-sulfonic acid made alkaline with soda. The coupling is complete after stirring has been continued for several hours. The mixture which amounts to about 800 parts by volume is heated to 90° C., and the acetamino group is saponified by addition of 110 parts of caustic soda solution of 30 per cent. strength, and further heating to 90-100° C. for about 1¼ hours. By addition of common salt, the diaminoazo dyestuff, 4-aminobenzene-(1-azo-2')-5'-amino-1'-hydroxynaphthalene sulfonic acid-3' is precipitated and is filtered whilst hot. The sodium salt of the dyestuff is again stirred in about 1000 parts of water, a solution of 13.8 parts of sodium nitrite is added and tetrazotization is brought about by addition of 55 parts of hydrochloric acid of 30 per cent. strength at 15° C. The tetrazo compound is coupled with a solution of 22 parts of 1:3-dihydroxybenzene made alkaline with soda. After stirring for several hours coupling is complete, and the dyestuff, which is mostly precipitated, can be filtered directly. It corresponds in the free state to the formula

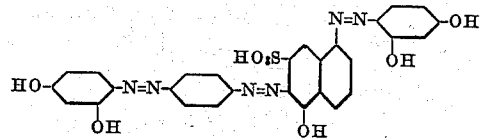

The new dyestuff is a very bronzy powder which dissolves in water to a violet and in concentrated sulfuric acid to a pure blue solution. It dyes cotton in violet-black shades; by aftertreatment with 1-diazo-4-nitrobenzene on the fibre, olive-black shades which are very fast to washing are obtained.

Replacement of resorcinol by 21.8 parts of meta-aminophenol leads to a product which possesses similar properties. It corresponds in the free state to the formula

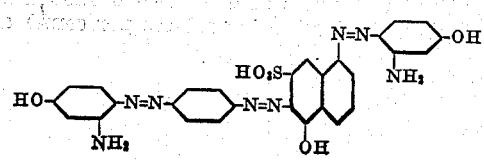

and dyes cotton violet black shades which, by after-treatment with 1-diazo-4-nitrobenzene, become essentially blacker.

The same dyestuff is obtained if the 1-amino-4-acetaminobenzene be replaced by the corresponding oxamic acid derivative, or also by 1-diazo-4-nitrobenzene, the nitro group of the azo dyestuff then being converted into an amino group by treatment with reducing agents after the first coupling has taken place.

Similar dyestuffs are obtained if the 1-amino-4-acetaminobenzene be replaced by its nuclear substituted products, for example, by 1-amino-2-chloro-5-methoxy-4-acetaminobenzene or 1-amino-3-methyl- or -3-methoxy-4-acetaminobenzene.

The properties of the dyestuffs obtainable from such compounds can be seen from the following table:

| Tetrazotized monoazo-dyestuff | First component | Second component | Direct dyeing on cotton | Dyeing developed with 1-diazo-4-nitrobenzene |
|---|---|---|---|---|
| No. 1—4-amino-2:5-dimethylbenzene-(1-azo-2')-5'-amino-1'-hydroxynaphthalene-sulfonic acid-3'. | 1:3-dihydroxy-benzene | 1:3-dihydroxy-benzene | Grey | Olive black. |
| No. 2—4-amino-2:5-dichlorobenzene-(1-azo-2')-5'-amino-1'-hydroxynaphthalene-sulfonic acid-3'. | ----idem---- | ----idem---- | Violet black | Idem. |
| No. 3—4-amino-3-methoxybenzene-(1-azo-2')-5'-amino 1'-hydroxynaphthalene-sulfonic acid-3'. | ----idem---- | ----idem---- | Blue black | Black olive. |
| No. 4—Idem | 1-hydroxy-3-amino-benzene | 1-hydroxy-3-amino-benzene | Violet black | Black. |
| No. 5—4-amino-2:5-dimethoxybenzene-(1-azo-2')-5'-amino-1'-hydroxynaphthalene sulfonic acid-3'. | 1:3-dihydroxy-benzene | 1:3-dihydroxy-benzene | Blue green | Olive green. |
| No. 6—4-amino-2-chloro-5-methoxybenzene-(1-azo-2')-5'-amino-1'-hydroxynaphthalene sulfonic acid-3'. | ----idem---- | ----idem---- | Blue black | Black olive. |
| No. 7—Idem | 1-hydroxy-3-amino-benzene | 1-hydroxy-3-amino-benzene | ----do---- | Olive black. |

The dyestuffs Nos. 2, 4 and 6 correspond in the free form to the following formulas:

No. 2
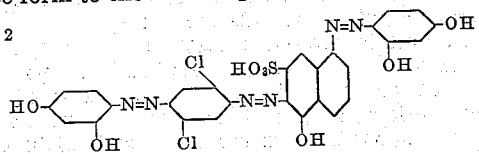

No. 4
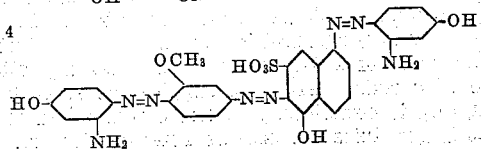

No. 6
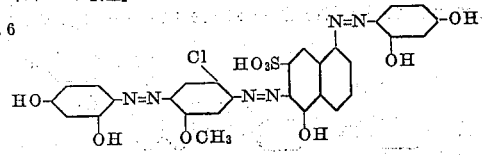

*Example 2*

A dyebath is prepared by adding 1 part of the dyestuff described in paragraph 1 of Example 1, 1 part of anhydrous sodium carbonate and 15 parts of sodium sulfate in 1000 parts of water. 50 parts of cotton are entered therein at 40–50° C., the bath is brought gradually to the boil and boiling is continued for about 1 hour. The material is then rinsed.

The cotton which has been dyed in a violet black shade, is now entered into a fresh cold bath, containing per liter the diazo solution prepared from 20 parts of 4-nitro-1-aminobenzene, 50 parts of hydrochloric acid (30 per cent.) and 10 parts of sodium nitrite and neutralized with 10 parts of soda and 20 parts of sodium acetate. The material is worked for ½ hour therein and is then thoroughly rinsed. A deep olive-black dyeing is obtained of very good fastness to water and washing which yields excellent discharges with both neutral and alkaline discharge colors.

What we claim is:

1. The monosulfonated azo dyestuffs corresponding in the free state to the general formula

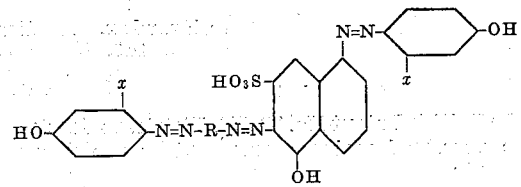

in which R represents an arylene radical of the benzene series, in which the two azo groups stand in the 1:4-position to each other and in which each of the two x represents a substituent selected from the group consisting of hydroxyl and amino groups.

2. The monosulfonated azo dyestuffs corresponding in the free state to the general formula

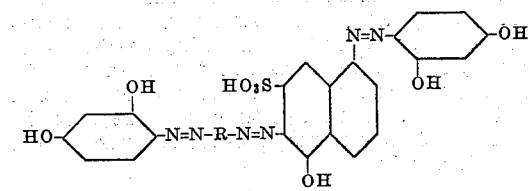

in which R represents an arylene radical of the benzene series and in which the two azo groups stand in the 1:4-position to each other.

3. The monosulfonated azo dyestuff corresponding in the free state to the formula

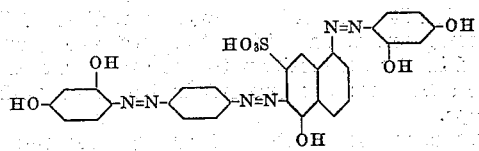

JOSEPH GYR.
RAYMOND GUNST.